United States Patent
Lubow et al.

(10) Patent No.: US 7,182,259 B2
(45) Date of Patent: Feb. 27, 2007

(54) METHOD AND APPARATUS FOR APPLYING BAR CODE INFORMATION TO PRODUCTS DURING PRODUCTION

(75) Inventors: Allen Lubow, Brooklyn, NY (US); Ron Barenburg, New York, NY (US)

(73) Assignee: International Barcode Corporation, New York, NY (US)

( * ) Notice: Subject to any disclaimer, the term of this patent is extended or adjusted under 35 U.S.C. 154(b) by 0 days.

(21) Appl. No.: 11/001,876

(22) Filed: Dec. 2, 2004

(65) Prior Publication Data

US 2005/0082376 A1    Apr. 21, 2005

Related U.S. Application Data

(63) Continuation of application No. 10/207,658, filed on Jul. 29, 2002, now abandoned.

(60) Provisional application No. 60/348,000, filed on Oct. 26, 2001.

(51) Int. Cl.
G06K 7/10   (2006.01)
G06K 5/00   (2006.01)

(52) U.S. Cl. .................. 235/462.01; 235/437

(58) Field of Classification Search .......... 235/462.01, 235/385, 462.07, 462.09, 437
See application file for complete search history.

(56) References Cited

U.S. PATENT DOCUMENTS

| 3,684,418 A | 8/1972 | Langecker |
|---|---|---|
| 3,698,600 A | 10/1972 | Foote |
| 3,985,603 A | 10/1976 | Berner |
| 3,985,605 A | 10/1976 | Treiber et al. |
| 4,076,570 A | 2/1978 | Medley et al. |
| 4,115,011 A | 9/1978 | Brunsting |
| 4,306,400 A | 12/1981 | Coleman |
| 4,319,684 A | 3/1982 | Backman |

(Continued)

FOREIGN PATENT DOCUMENTS

EP    0214759    3/1897

(Continued)

OTHER PUBLICATIONS

International Search Report mailed Feb. 26, 2003 in corresponding International Application No. PCT/US02/34232.

*Primary Examiner*—Daniel St. Cyr
(74) *Attorney, Agent, or Firm*—Davidson Berquist Jackson & Gowdey, LLP

(57) ABSTRACT

Bar code information is printed on a printable surface associated with a product, such as a label or container of the product, or the product itself, during a production run under the control of a printer computer. The bar code information may include two components of a composite bar code symbol, where the first component is either pre-printed or printed during a production run, and the second component is printed during the production run. The first component may identify a product that is carried in the containers, while the second component identifies a lot, batch, expiration date or commodity number. In another aspect, check data is used to confirm the accuracy of information that is used by a printer computer to control a printer. In another aspect, first and second bar code symbols portions are read to recover information, and a database is accessed to determine if the recovered information is consistent.

32 Claims, 8 Drawing Sheets

U.S. PATENT DOCUMENTS

| | | |
|---|---|---|
| 4,342,038 A | 7/1982 | Lemelson |
| 4,531,313 A | 7/1985 | Fast |
| 4,539,766 A | 9/1985 | Fast |
| 4,573,596 A | 3/1986 | Slat |
| 4,586,316 A | 5/1986 | Backman |
| 4,601,926 A | 7/1986 | Jabarin |
| 4,628,193 A | 12/1986 | Blum |
| 4,661,001 A | 4/1987 | Takai |
| 4,779,367 A | 10/1988 | Fast |
| 4,842,141 A | 6/1989 | Segal |
| 4,850,488 A | 7/1989 | Humbert |
| 4,864,112 A | 9/1989 | Imai et al. |
| 4,882,675 A | 11/1989 | Nichtberger |
| 4,914,828 A | 4/1990 | Fiedor et al. |
| 4,967,928 A | 11/1990 | Carter |
| 4,998,623 A | 3/1991 | Doull |
| 5,008,151 A | 4/1991 | Tominaga |
| 5,015,832 A | 5/1991 | Filipski et al. |
| 5,122,969 A | 6/1992 | Seshimoto |
| 5,128,527 A * | 7/1992 | Kawai et al. .......... 235/462.01 |
| 5,132,709 A | 7/1992 | West |
| 5,197,215 A | 3/1993 | Torsleff |
| 5,203,591 A | 4/1993 | Treat |
| 5,206,490 A | 4/1993 | Petigrew |
| 5,211,061 A | 5/1993 | Goodwin |
| 5,229,195 A | 7/1993 | Maruoka |
| 5,252,395 A | 10/1993 | Maruoka |
| 5,254,302 A | 10/1993 | Yamanaka |
| 5,273,798 A | 12/1993 | Miner |
| 5,276,315 A | 1/1994 | Surka |
| 5,278,271 A | 1/1994 | Miyajima |
| 5,298,731 A * | 3/1994 | Ett ............................. 235/494 |
| D347,021 S | 5/1994 | Adams et al. |
| 5,331,118 A | 7/1994 | Jensen |
| 5,364,133 A | 11/1994 | Hofer |
| 5,372,439 A | 12/1994 | Poole |
| 5,380,991 A | 1/1995 | Valencia et al. |
| 5,389,437 A | 2/1995 | Miyajima |
| 5,395,181 A | 3/1995 | Dezse et al. |
| 5,415,482 A | 5/1995 | Poole |
| 5,468,110 A | 11/1995 | McDonald |
| 5,488,815 A | 2/1996 | Abrams |
| 5,489,158 A | 2/1996 | Wang et al. |
| 5,565,059 A | 10/1996 | Edwards |
| 5,577,367 A | 11/1996 | Abrams |
| 5,578,797 A | 11/1996 | Hewitt |
| 5,586,037 A | 12/1996 | Gil |
| 5,593,267 A | 1/1997 | McDonald |
| 5,615,575 A | 4/1997 | Goodwin |
| 5,620,087 A | 4/1997 | Martin |
| 5,646,389 A * | 7/1997 | Bravman et al. ............ 235/385 |
| 5,657,066 A | 8/1997 | Adams |
| 5,658,410 A | 8/1997 | Edwards |
| 5,674,347 A | 10/1997 | Edwards |
| 5,675,137 A | 10/1997 | van Haagen et al. |
| 5,678,137 A | 10/1997 | Katayama |
| 5,696,686 A | 12/1997 | Sanka |
| 5,723,853 A | 3/1998 | Longacre, Jr. et al. |
| 5,733,693 A | 3/1998 | Nohr |
| 5,752,234 A | 5/1998 | Withers |
| 5,768,991 A | 6/1998 | Cless |
| 5,770,841 A | 6/1998 | Moed |
| 5,776,297 A | 7/1998 | Edwards |
| 5,777,310 A | 7/1998 | Liu |
| 5,780,830 A | 7/1998 | Boie |
| 5,790,162 A | 8/1998 | Adams |
| 5,816,718 A | 10/1998 | Poole |
| 5,818,492 A | 10/1998 | Look |
| 5,822,738 A | 10/1998 | Shah |
| 5,825,947 A | 10/1998 | Sasaki et al. |
| 5,840,243 A | 11/1998 | Hicks et al. |
| 5,853,244 A * | 12/1998 | Hoff et al. .................. 366/141 |
| 5,861,613 A | 1/1999 | Apelberg et al. |
| 5,865,471 A | 2/1999 | Nohr et al. |
| 5,869,341 A | 2/1999 | Woodaman |
| 5,872,585 A | 2/1999 | Donato et al. |
| 5,874,980 A | 2/1999 | West |
| 5,878,885 A | 3/1999 | Wangu et al. |
| 5,880,443 A | 3/1999 | McDonald et al. |
| 5,889,270 A | 3/1999 | van Haagen et al. |
| 5,909,233 A | 6/1999 | Hamman et al. |
| 5,953,170 A | 9/1999 | Glancy |
| 5,978,004 A | 11/1999 | Ehrhardt |
| 5,995,128 A | 11/1999 | Adams et al. |
| 6,020,906 A | 2/2000 | Adams et al. |
| 6,034,708 A | 3/2000 | Adams et al. |
| 6,038,200 A | 3/2000 | Ozue et al. |
| 6,057,870 A | 5/2000 | Monnier et al. |
| 6,060,200 A | 5/2000 | Nohr et al. |
| 6,070,805 A | 6/2000 | Kaufman et al. |
| 6,088,482 A | 7/2000 | He et al. |
| 6,102,289 A | 8/2000 | Gabrielson |
| 6,151,037 A | 11/2000 | Kaufman et al. |
| 6,152,621 A | 11/2000 | Langan |
| 6,158,660 A * | 12/2000 | Blanford et al. ....... 235/462.11 |
| 6,190,610 B1 | 2/2001 | Goldsmith et al. |
| 6,210,795 B1 | 4/2001 | Nelson et al. |
| 6,219,587 B1 | 4/2001 | Ahlin et al. |
| 6,234,781 B1 | 5/2001 | Hicks et al. |
| 6,240,403 B1 | 5/2001 | Shah et al. |
| 6,253,817 B1 | 7/2001 | Edwards et al. |
| 6,259,654 B1 | 7/2001 | de la Huerga |
| 6,267,296 B1 | 7/2001 | Ooshima et al. |
| 6,270,724 B1 | 8/2001 | Woodaman |
| 6,273,986 B1 | 8/2001 | Egan |
| 6,295,262 B1 | 9/2001 | Kusumoto et al. |
| 6,304,323 B1 | 10/2001 | Ishikura et al. |
| 6,332,574 B1 | 12/2001 | Shigekusa et al. |
| 6,365,176 B1 | 4/2002 | Bell et al. |
| 6,370,841 B1 | 4/2002 | Chudy et al. |
| 6,370,844 B1 | 4/2002 | Stricker |
| 6,398,117 B1 | 6/2002 | Oakeson et al. |
| 6,477,514 B1 | 11/2002 | Gil et al. |
| 6,479,016 B1 | 11/2002 | Goldsmith et al. |
| 6,527,161 B2 | 3/2003 | Murakami et al. |
| 6,529,446 B1 | 3/2003 | de la Huerga |
| 6,540,081 B2 | 4/2003 | Balz et al. |
| 6,571,983 B1 | 6/2003 | Schumann |
| 6,573,057 B2 | 6/2003 | Goodearl et al. |
| 6,573,282 B1 | 6/2003 | Yaksh et al. |
| 6,573,293 B2 | 6/2003 | Tang et al. |
| 6,574,166 B2 | 6/2003 | Niemiec |
| 6,576,325 B1 | 6/2003 | Yamanaka et al. |
| 6,576,650 B1 | 6/2003 | Yaksh |
| 6,579,715 B1 | 6/2003 | Friedrich et al. |
| 6,579,854 B1 | 6/2003 | Mitchell et al. |
| 6,579,897 B2 | 6/2003 | Tang et al. |
| 6,581,799 B1 | 6/2003 | Garrant et al. |
| 6,582,735 B2 | 6/2003 | Stogniew et al. |
| 6,582,957 B1 | 6/2003 | Turner, Jr. et al. |
| RE38,174 E | 7/2003 | Look |
| 6,586,390 B1 | 7/2003 | Haley et al. |
| 6,589,559 B1 | 7/2003 | Yanagawa |
| 6,589,560 B2 | 7/2003 | Foster et al. |
| 6,593,080 B1 | 7/2003 | Smith |
| 6,593,104 B1 | 7/2003 | Stone et al. |
| 6,596,723 B1 | 7/2003 | Watkins et al. |
| 6,596,772 B1 | 7/2003 | Huang et al. |
| 6,599,902 B2 | 7/2003 | Cui et al. |
| 6,601,729 B1 | 8/2003 | Papp |
| 6,604,019 B2 | 8/2003 | Ahlin et al. |
| 6,605,437 B2 | 8/2003 | Kleyn et al. |
| 6,605,644 B2 | 8/2003 | Kamin et al. |
| 6,610,497 B1 | 8/2003 | Acton et al. |

| | | | | | | |
|---|---|---|---|---|---|---|
| 6,610,536 B2 | 8/2003 | Tang et al. | | EP | 0115956 | 8/1984 |
| 6,610,688 B2 | 8/2003 | Liang et al. | | EP | 0124803 | 11/1984 |
| 6,611,733 B1 | 8/2003 | De La Huerga | | EP | 0131964 | 1/1985 |
| 6,616,932 B2 | 9/2003 | Chrai et al. | | EP | 0134996 | 3/1985 |
| 6,617,459 B2 | 9/2003 | Peters et al. | | EP | 0135117 | 3/1985 |
| 6,620,473 B2 | 9/2003 | Nishizawa et al. | | EP | 0160860 | 11/1985 |
| 6,625,955 B2 | 9/2003 | Aylward | | EP | 0162510 | 11/1985 |
| 6,627,031 B1 | 9/2003 | Pinchen et al. | | EP | 0170854 | 2/1986 |
| 6,630,158 B2 | 10/2003 | Popp et al. | | EP | 0179940 | 5/1986 |
| 6,630,304 B1 | 10/2003 | Styrkarsdottir et al. | | EP | 0190009 | 8/1986 |
| 6,631,825 B2 | 10/2003 | Garrant et al. | | EP | 0193295 | 9/1986 |
| 6,635,640 B2 | 10/2003 | Tang et al. | | EP | 0197425 | 10/1986 |
| 6,635,742 B1 | 10/2003 | Boyle et al. | | EP | 0205691 | 12/1986 |
| 6,638,977 B1 | 10/2003 | Madison et al. | | EP | 0210728 | 2/1987 |
| 6,642,232 B2 | 11/2003 | Mattson et al. | | EP | 0223343 | 5/1987 |
| 6,642,251 B1 | 11/2003 | Tang et al. | | EP | 0304146 | 2/1989 |
| 6,645,758 B1 | 11/2003 | Schnipelsky et al. | | EP | 0306727 | 3/1989 |
| 6,649,657 B2 | 11/2003 | Cameron et al. | | EP | 0386097 | 5/1989 |
| 6,651,378 B2 | 11/2003 | Baker | | EP | 0322134 | 6/1989 |
| 6,652,929 B2 | 11/2003 | Moriya et al. | | EP | 0335209 | 10/1989 |
| 6,653,308 B2 | 11/2003 | Guan et al. | | EP | 0354817 | 2/1990 |
| 6,653,526 B2 | 11/2003 | Leviten | | EP | 0383322 | 8/1990 |
| 6,656,940 B2 | 12/2003 | Tang et al. | | EP | 0444331 | 9/1991 |
| 6,660,744 B1 | 12/2003 | Hirst et al. | | EP | 0461298 | 12/1991 |
| 6,663,746 B2 | 12/2003 | Dronzek | | EP | 0471530 | 2/1992 |
| 6,664,239 B2 | 12/2003 | Mitchell et al. | | EP | 0471854 | 2/1992 |
| 2001/0002448 A1 | 5/2001 | Wilson | | EP | 0496455 | 7/1992 |
| 2001/0020594 A1 | 9/2001 | Hicks | | EP | 0502396 | 9/1992 |
| 2001/0028308 A1 | 10/2001 | De La Huerga | | EP | 0536374 | 11/1992 |
| 2001/0037465 A1 | 11/2001 | Hart | | EP | 0592620 | 9/1993 |
| 2002/0007281 A1 | 1/2002 | Gil | | EP | 0568088 | 11/1993 |
| 2002/0019777 A1 | 2/2002 | Schwab | | EP | 0572999 | 12/1993 |
| 2002/0026768 A1 | 3/2002 | Duncan | | EP | 0574129 | 12/1993 |
| 2002/0061981 A1 | 5/2002 | Donald | | EP | 0729412 | 5/1995 |
| 2002/0061982 A1 | 5/2002 | Donald | | EP | 0745536 | 5/1995 |
| 2002/0072079 A1 | 6/2002 | Woodaman | | EP | 0663654 | 7/1995 |
| 2002/0088855 A1 | 7/2002 | Hodes | | EP | 0749362 | 9/1995 |
| 2002/0091537 A1 | 7/2002 | Algazi | | EP | 0686564 | 12/1995 |
| 2002/0095238 A1 | 7/2002 | Ahlin | | EP | 0686900 | 12/1995 |
| 2002/0103653 A1 | 8/2002 | Huxter | | EP | 0775324 | 2/1996 |
| 2002/0107305 A1 | 8/2002 | Edler | | EP | 0699304 | 3/1996 |
| 2002/0116267 A1 | 8/2002 | Weisz | | EP | 0788635 | 5/1996 |
| 2002/0117405 A1 | 8/2002 | Wang | | EP | 0715273 | 6/1996 |
| 2002/0124945 A1 | 9/2002 | Muir | | EP | 0747871 | 12/1996 |
| 2002/0133434 A1 | 9/2002 | Nevel | | EP | 0852520 | 4/1997 |
| 2002/0147152 A1 | 10/2002 | Bell | | EP | 0855894 | 4/1997 |
| 2002/0147153 A1 | 10/2002 | Bell | | EP | 0772151 | 5/1997 |
| 2002/0150649 A1 | 10/2002 | Bell | | EP | 0798239 | 10/1997 |
| 2002/0158137 A1 | 10/2002 | Bell | | EP | 0800156 | 10/1997 |
| 2002/0196150 A1 | 12/2002 | Wildman | | EP | 0912319 | 12/1997 |
| 2003/0015592 A1 | 1/2003 | Brabaw | | EP | 0929874 | 4/1998 |
| 2003/0042167 A1 | 3/2003 | Balz | | EP | 0843293 | 5/1998 |
| 2003/0070394 A1 | 4/2003 | Rosenbaum | | EP | 0847865 | 6/1998 |
| 2003/0099158 A1 | 5/2003 | De La Huerga | | EP | 0893257 | 1/1999 |
| 2003/0113228 A1 | 6/2003 | Goldsmith | | EP | 0915014 | 5/1999 |
| 2003/0115162 A1 | 6/2003 | Konick | | EP | 0918416 | 5/1999 |
| 2003/0143287 A1 | 7/2003 | Bell | | EP | 1037806 | 6/1999 |
| 2003/0151247 A1 | 8/2003 | Nishizawa | | EP | 0949599 | 10/1999 |
| 2003/0173118 A1 | 9/2003 | Schuller | | EP | 0986035 | 3/2000 |
| 2003/0189058 A1 | 10/2003 | Liff | | EP | 1006358 | 6/2000 |
| 2003/0195644 A1 | 10/2003 | Borders | | EP | 1041529 | 10/2000 |
| 2003/0205412 A1 | 11/2003 | Hewitt | | EP | 1055715 | 11/2000 |
| 2003/0209317 A1 | 11/2003 | Koehler | | EP | 1061409 | 12/2000 |
| 2003/0219513 A1 | 11/2003 | Gordon | | EP | 1076007 | 2/2001 |
| | | | | EP | 1117058 | 7/2001 |
| | FOREIGN PATENT DOCUMENTS | | | EP | 1125849 | 8/2001 |
| | | | | EP | 1176003 | 1/2002 |
| EP | 0036951 | 10/1981 | | EP | 1197892 | 4/2002 |
| EP | 0037649 | 10/1981 | | EP | 1205873 | 5/2002 |
| EP | 0066680 | 12/1982 | | EP | 1234672 | 5/2002 |
| EP | 0072910 | 3/1983 | | EP | 1211191 | 6/2002 |
| EP | 0094800 | 11/1983 | | EP | 1226806 | 7/2002 |
| EP | 0105061 | 4/1984 | | EP | 1234661 | 8/2002 |

| | | |
|---|---|---|
| EP | 1302300 | 4/2003 |
| EP | 1359527 | 11/2003 |
| GB | 1502075 | 2/1978 |
| GB | 2163582 | 2/1986 |
| GB | 2223463 | 4/1990 |
| GB | 2229809 | 10/1990 |
| GB | 2283318 | 5/1995 |
| GB | 2292361 | 2/1996 |
| JP | 03-029729 | 2/1991 |
| JP | 05-229505 | 9/1993 |
| JP | 07-038299 | 2/1995 |
| JP | 08-007058 | 1/1996 |
| JP | 10-139025 | 5/1998 |
| JP | 2001-109960 | 4/2001 |
| JP | 2002-068147 | 3/2002 |
| JP | 2002-352332 | 12/2002 |
| JP | 2003-016528 | 1/2003 |
| JP | 2003-168170 | 6/2003 |
| WO | WO 87/05882 | 10/1987 |
| WO | WO 94/27126 | 11/1994 |
| WO | WO 94/27144 | 11/1994 |
| WO | WO 95/31336 | 11/1995 |
| WO | WO 96/19776 | 6/1996 |
| WO | WO 97/03888 | 2/1997 |
| WO | WO 97/11790 | 4/1997 |
| WO | WO 97/48543 | 12/1997 |
| WO | WO 98/14777 | 4/1998 |
| WO | WO 98/20337 | 5/1998 |
| WO | WO 89/06191 | 11/1998 |
| WO | WO 00/24838 | 5/2000 |
| WO | WO 01/20478 | 3/2001 |
| WO | WO 02/21820 | 3/2001 |
| WO | WO 00/25720 | 5/2001 |
| WO | WO 01/35348 | 5/2001 |
| WO | WO 01/54984 | 8/2001 |
| WO | WO 01/58670 | 8/2001 |
| WO | WO 01/76128 | 10/2001 |
| WO | WO 02/35317 | 5/2002 |
| WO | WO 02/37305 | 5/2002 |
| WO | WO 03/017058 | 2/2003 |
| WO | WO 03/055770 | 7/2003 |
| WO | WO 2003/089313 A2 | 10/2003 |
| WO | WO 03/96873 | 11/2003 |

\* cited by examiner

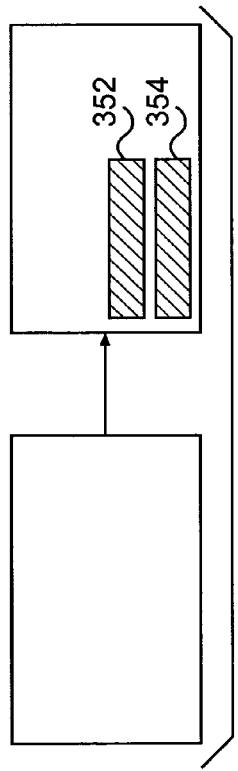
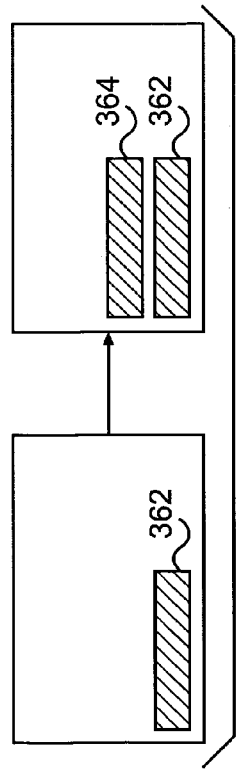
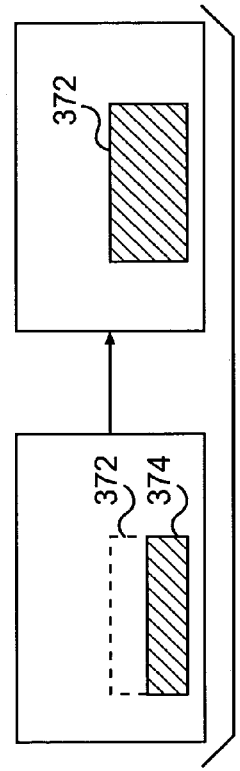
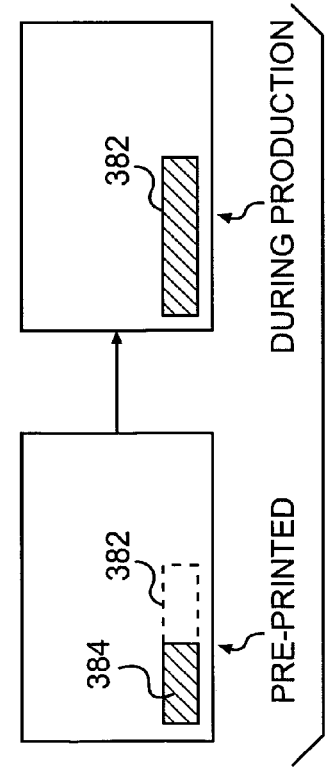
FIG. 3(c)
FIG. 3(d)
FIG. 3(e)
FIG. 3(f)

METHOD AND APPARATUS FOR APPLYING BAR CODE INFORMATION TO PRODUCTS DURING PRODUCTION

CROSS REFERENCE TO RELATED APPLICATIONS

This application claims the priority of application Ser. No. 10/207,658, titled Method and Apparatus for Applying Bar Code Information to Products during Production, which was filed on Jul. 29, 2002, the disclosure of which is incorporated herein by reference in its entirety.

BACKGROUND OF THE INVENTION

This application claims the benefit of U.S. provisional patent application No. 60/348,000, entitled "System and method for supplementing bar coded products with additional bar codes," filed Oct. 26, 2001, and incorporated herein by reference.

The present invention provides methods and apparatuses for applying bar codes to products on a production line, and also addresses the need for quality control in a production line.

Various types of bar code symbologies have been developed to meet the specific needs of different activities including manufacturing, warehousing, shipping and merchandising. Moreover, in the field of healthcare, the Food and Drug Administration has proposed requiring that manufacturers provide bar codes on all pharmaceutical and biological products. Such bar codes can identify data such as the National Drug Code (NDC), a lot or batch number and the expiration date. The NDC is a unique numerical code identifying the manufacturer, product, dosage, strength, and package size or type. The proposed rule is an attempt to reduce the number of errors in dispensing drugs in hospitals and other healthcare facilities. In practice, the bar code on a drug could be matched against a bar code associated with the patient and the patient's drug regime, such as by using bar code provided on a patient's wrist bracelet or medical file. The hospitals would obtain appropriate scanning equipment for scanning the drugs' bar code and the patient's bar code, and a computer database would process the data to inform the healthcare professional whether the correct drug/medicine has been obtained. Additionally, by bar coding the drugs' expiration dates and lot numbers, identification of expired and recalled drugs can be facilitated.

Bar codes include both one-dimensional (linear) (1-D) and two-dimensional (2-D) types. Linear, or 1-D symbologies include Universal Product Code (UPC)/European Article Number (EAN), Code 39, Codabar, the multi-color Pharmacode (Laetus), Code 128, Code 93, Telepen, the Reduced Space Symbology (RSS) family, including RSS-14, RSS Limited and RSS Expanded, ITF-14 (Interleaved 2 of 5) and ISSN/ISBN. 2-D symbologies include PDF417 (Portable Data File), micro PDF417, Data Matrix and Maxi-Code. Moreover, a composite bar code symbology combines two or more bar code symbols. For example, a composite bar code may be formed by combining a 1-D symbol with a 2-D symbol. One example is the EAN.UCC (European Article Number—Uniform Code Council, Inc.) composite symbol. RSS composite symbols may be formed by combining an RSS linear symbol with a EAN.UCC 2-D Composite Component (CC). A composite bar code symbol may also include a 1-D symbol that is printed in two or more rows.

In particular, the RSS family contains three linear symbologies that can be used with the EAN.UCC system. RSS-14 encodes the full 14-digit Global Trade Identification Number (GTIN) in a linear symbol that can be scanned omni directionally. The GTIN is made up of one character for a packaging designator, two system digits, five characters for the manufacturer, five characters for the item and one check digit. It also has truncated and stacked formats. RSS Limited encodes the same 14-digits with packing indicators limited to zero or one in a linear symbol. RSS Expanded encodes EAN.UCC primary identification plus supplemental element strings such as weight and "best before" date in a linear symbol that can be scanned omni directionally. Moreover, this symbol can be printed in multiple rows as a stacked symbol. Furthermore, any RSS symbol can be printed as a standalone linear symbol or as part of a composite symbol with an accompanying 2-D composite component printed above the RSS linear component.

However, there are various technical challenges to bar coding products on a production line. For example, it is not clear how an appropriate bar code can be provided on small drug products, such as a unit dose product, which are commonly used due to their convenience for hospitals, healthcare professionals and patients. These challenges include accommodating the significant amount of information that must be provided in a limited available space. Moreover, the use of bar codes present challenges on the production line for all products when information specific to the production run, such as lot, batch, expiration date or commodity number are bar coded. Furthermore, quality control considerations on the production line must be addressed to ensure that the correct bar code information is applied to the products.

The present invention addresses the above and other issues.

SUMMARY OF THE INVENTION

The present invention provides methods and apparatuses for printing bar code information on products on a production line.

One aspect of the invention provides a method for applying bar code information to products in a production line. The method involves printing bar code information related to the product substantially in real-time with respect to a production line. The bar code information may be printed on any printable surface related to the product, including a container and a label of the product, or on the product itself. For example, the information may relate to a production run, such as lot, batch, expiration date or commodity number of the product. In the area of drug manufacturing, in particular, the commodity number may be a six-digit number assigned to each validated label by the manufacturer. Such labels are validated by an agency such as the FDA. The commodity number identifies the formulation of a drug, such as how it is produced, e.g., what ingredients, concentrations, temperature, volumes and pressures are used. Having the commodity number encoded in the bar code allows a machine-readable method to verify that the correct label is being used in an automated fashion. Other bar code information, such as relating to the identity of the product, may be printed in real time in the same or another bar code indicia or symbol, or pre-printed on the label or the product, etc.

In one embodiment, a method for applying bar code information to a product on a production line includes printing bar code information on a printable surface associated with the product, such as a label or a container of the product, during a production run, that supplements bar code information associated with the product. The supplemental bar code information may relate to parameters of the production run, e.g., such as a lot, batch, expiration date and commodity number of the products. The bar code information associated with the product may be a pre-printed bar code symbol that identifies the product and/or information for using the product, e.g., directions for administering a drug, preferred storage conditions (such as temperature range) and the like. Moreover, the bar code information may be provided in a composite bar code symbol. Advantageously, by printing the bar code information associated with the production run during the production run, e.g., substantially in real-time, the production process proceeds more efficiently. For example, there is no need to prepare and stockpile labels for different production runs, which can lead to errors if the wrong labels are used for the wrong production run. Moreover, the bar coded indicia can be easily reconfigured on the production floor or other local or remote location by re-programming a printer computer to reflect changes in the production run information.

In another embodiment, a method for applying bar code information to a product on a production line includes programming a computer with information associated with a production run, and printing, responsive to the programming, bar code indicia on a printable surface associated with the products during the production run that carries the production run related information. Various bar code indicia may be printed, including a single 1-D or 2-D bar code, or a composite bar code. Moreover, the computer may be programmed with the production run related information in various ways, such as by scanning a bar code, e.g., on a work order, receiving a manual user input via a keyboard or the like and receiving signals electronically, such as from a computer that is local to the production line, in the same facility, or remotely located, e.g., in another city. The bar code information may be printed using ink jet printing, laser marking, thermal transfer printing, thermal printing, thermal printing, electrographic printing, laser printing or flexographic printing, for instance.

In another embodiment, an error detection method for use in a production line in which bar code information is applied to products includes receiving first check data at a printer computer that controls a printer on the production line, where the first check data is calculated at another computer based on first information associated, at least in part, with a production run on the production line. The method further includes computing second check data at the printer computer based on second information associated, at least in part, with the production run and determining whether the first and second check data agree. If they agree, the printer may be instructed to print the second information on the products as at least one bar code symbol during the production run. An error message may be set if the first and second check data do not agree, e.g., to alert an operator on the production line or other location that there is a problem. Moreover, the first check data may be received at the printer computer via an electronic transmission from another computer. The second information may be provided to the computer also via an electronic transmission or via a manual user entry or bar coded work order, for use in computing the second check data. The first and second information may include a product identifier and production run related information. This method may be used, e.g., to ensure that the production run-related information is accurately communicated to the printer computer.

Furthermore, the check data provided to the printer computer need not be continuously provided. For example, it may be provided once during a production run or other period in which the production run related information does not change. Or, the check data may be provided periodically during a production run. The check data may further be used by an inspection station that scans the bar code after it is printed on the product or label to confirm the bar code is accurate. However, it is not necessary to print the check data in the bar code information.

In another embodiment, an error detection method for use in a production line in which bar code information is applied to products includes reading first bar code indicia from a printed surface associated with at least one product during a production run on the production line to recover first information. Furthermore, second bar code indicia is read from the printed surface during the production run to recover second information, and the first and second information are analyzed to see if they are consistent. For example, the first bar code indicia may designate a product identifier such as a specific drug, while the second bar code indicia identifies a commodity number, in which case the information is analyzed to determine if the commodity number is known to be associated with the particular drug. In practice, a number of commodity numbers may be associated with the particular drug.

Corresponding apparatuses are also presented.

BRIEF DESCRIPTION OF THE DRAWINGS

FIG. 3(*b*) illustrates a label with first and second bar code information of a composite bar code in accordance with one embodiment of the invention;

FIGS. 3(*c*)–3(*f*) illustrate pre-printed labels and labels printed during production in accordance with different embodiments of the invention;

FIG. 5(*b*) illustrates a scan line through a bar code tier with one dot line per tier;

FIG. 5(*c*) illustrates a scan line through a bar code tier with two dot lines per tier;

DETAILED DESCRIPTION OF PREFERRED EMBODIMENTS

Figure 1:
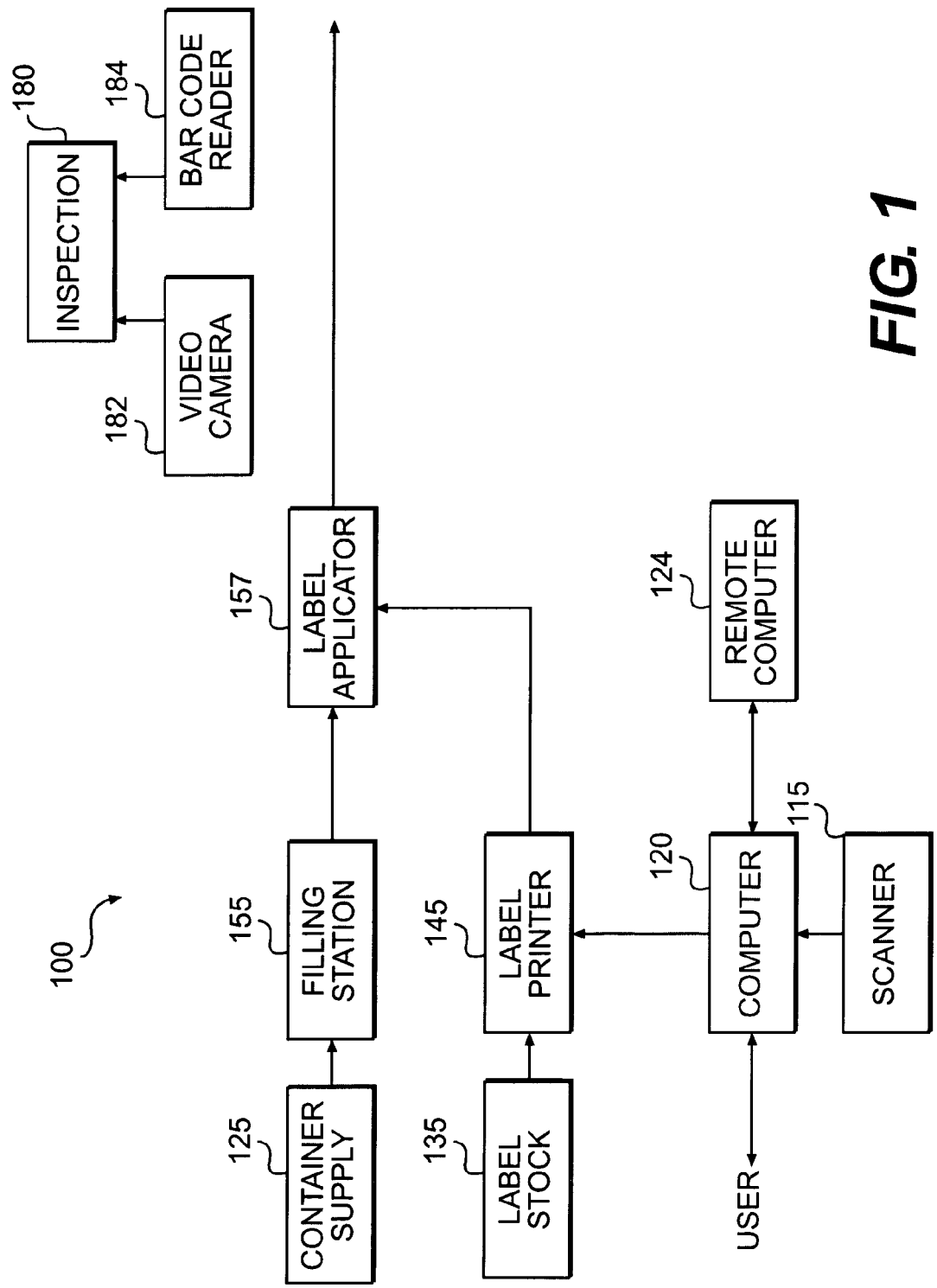
FIG. 1 illustrates a production line that prints bar code information on product labels in accordance with one embodiment of the invention.

In one aspect of the invention, labeling of products, including small product containers such as vials and ampoules that carry drugs, is done on a production line at high speeds. For instance, a typical vaccine label is very small, measuring, e.g., 0.75×2 inches. It is therefore difficult to print a lot of information on such labels, such as the product name, Global Trade Identification Number (GTIN), Uniform Product Code (UPC), NDC number with manufacturer's number, product number, packaging indicator (e.g., describing the type of packaging), lot or batch number, expiration date and commodity number. In addition to the machine readable bar code information, it is desirable to provide certain human readable text, such as the name of the drug or other product identifier. As an example, a small vial might have the following information printed on it in bar coded and human readable form: "NDC 01234 56789, Lot Number USA123, Expiration Date Mar. 3, 2004." Moreover, this text must meet certain size and typeface requirements. Previously, the problem of limited label space could only be solved by increasing the label size. However, this is not possible for many drug related single dose packages that are used by inserting them into housings or other structures that have a fixed size. Moreover, even if the package size can be increased, various drawbacks result, including increased production costs, shipping costs and storage space requirements. Moreover, available bar code symbologies may not be efficient enough to encode the required information in the allotted space.

Similarly, in the food industry, information that previously could not be bar coded due to space limitations can now be bar coded with the techniques disclosed herein, e.g., on a sticker that is attached to fruits or vegetables, or with a bar code printed on a milk carton or the like. This information may include country of origin, whether pesticides or hormones were used in preparing the product, what types, if any, health warnings related to a product such as possible allergic reactions, and so forth.

In one aspect, the present invention solves these problems by using compact bar code technology such as Reduced Space Symbology (RSS) to allow the desired information to be placed on a product within the available area. Moreover, by providing a sufficiently compact bar code symbology, the information can be encoded with room available to print the encoded data in human-readable form. This enables the healthcare provider or other person to identify the product even if a bar code scanner is not available. Additionally, having the product identification number (e.g., GTIN, NDC or UPC) along with the lot and expiration date makes it possible for a production line to be more fully automated.

Moreover, having the bar coded GTIN, lot and expiration date on a single dose vial or ampoule can profoundly change the pharmacist's or other healthcare provider's ability to administer and record a prescription. The pharmacist would normally, upon receiving a doctor's prescription, fill out a computerized form, print out a label, and proceed to fill a bottle or vial in the pharmacy. However, in accordance with one aspect of the invention, which may provide a bar-coded vial, the pharmacist can fill in the computerized prescription by scanning from the vial that has already been selected from inventory. As the drug vial is scanned, its NDC number is looked up in a database and its information is filled out on screen. In other words, the pharmacist can check the selection by looking at the screen before printing a label and dispensing the drug.

FIG. 1 illustrates a production line that prints bar code information on product labels in accordance with one embodiment of the invention. The production line, shown generally at 100, has several components and may take on many different configurations. In one possibility, a container supply bin or station 125 supplies successive product containers or packages to a filling station 155 using a conveyor belt or the like. The containers may be vials, ampoules, tubes or the like such as for single-dose drug containers (e.g., a 2-ml. single dose fliptop glass vial or a 1-ml. single dose glass ampoule). However, the present invention is meant to encompass essentially any container type, including larger containers such as 55-gallon drums. For example, the drum may have a first bar code on it when empty, and a second bar code may be applied, e.g., by thermal imaging, when the drum is filled, to identify the contents. The conveyer or other mechanism accepts the individual units/containers, holds them in a proper orientation to be worked with, and moves them around the production line from station to station. At the filling station 155, the containers are filled with the desired product and sealed using known manufacturing techniques. Printed instructions for use and packaging padding may also be provided.

A label applicator 157 applies labels to the product containers using known techniques after the labels exit from the label printer 145. For example, the labels may have an adhesive backing. In one approach, the label applicator 157 receives labels from a label printer 145 with bar code information printed thereon. Moreover, the label stock 135 used by the label printer 145 may have pre-printed bar code information. Pre-printing refers to printing that can occur before a production run, when the containers are being processed at the different stations. A number of pre-printed labels in the label stock 135 can therefore be stored ahead of time, e.g., in rolls, and used when needed by the label printer 145. Note that labels may be pre-printed at a location that is proximate to, or remote from, the production line 100. For instance, the labels may be pre-printed at a facility of an outside vendor.

Moreover, in one embodiment, the labels are pre-printed with the first part of a two or more part composite bar code. This first part may comprise a linear bar code in a stacked or non-stacked format. For example, in FIG. 3(a), the label 300 may be pre-printed with a first bar code symbol or indicia 310 that is provided using the RSS-14 stacked format that encodes information such as a product identifier. The labels in the label stock 135 may also include general information such as the manufacturer's name and logo, but do not include specific information related to a production run, such as lot or batch number, expiration date and commodity number, since this information is generally not available before a production run, and it is desirable to have a generic stock label that can be used subsequently with different production runs at different production lines as needed.

In another possibility, the labels are not pre-printed with bar code information, and all bar code information, including the example first bar code symbol 310, supplemental, second bar code symbol 330 and associated human readable information 320 is printed in real-time during a production run by the printer 145.

Moreover, information such as the product identifier may or may not be pre-printed. In some cases, such as when the production line 100 is dedicated to processing a specific product such as a specific drug, at least for a specific period of time, a number of stock labels 135 can be pre-printed with a product identifier bar code, and additional information related to the production run can be added in a supplemental, second bar code symbol to form a composite bar code symbol along with the associated human readable data. The pre-printed labels may also include the human readable information corresponding to the first and/or second bar code information, as well as other required information.

In the approach illustrated in FIG. 1, the label printer 145 prints the bar code and human readable information on the labels before the label is attached to the container at the label applicator 157. However, the printing may occur after the label has been attached to a product container by positioning the printer appropriately in the production line 100. In a further approach, the printing may occur at multiple printers, both before and after the label is attached to the container. Moreover, the printing may occur directly on the product container or other printable surface without using a label, as discussed further in connection with FIG. 2.

If the first bar code information has been pre-printed on the label, the printer 145 need only print the second bar code information and human readable information during a production run. If the first bar code information has not been pre-printed on the label, the printer 145 may print both the first and second bar code information along with the human readable information. Alternatively, the first and second bar code information may be respective independent bar codes of any type. Moreover, more than two bar code symbols may be provided if needed or desired. For example, a composite bar code may be printed that includes a linear bar code stacked in two or more rows with a 2-D bar code on top. Furthermore, multiple independent bar codes can be printed.

The printer 145 may be of various types whose requirements are based on factors such as speed and resolution. Both in-line and non-in-line printers may be used. In-line printers allow the bar code and human readable information to be printed on the labels or other printable surface as the labels are moving on the production line. This can improve overall production output relative to conventional techniques. For example, a conventional technique for applying an expiration date to a container is to stamp the container with a metal stamp that is manually created. However, this approach requires the labels to come to a complete stop before they can be stamped, and is subject to errors since it is manually configured, and the wrong date may be used, for example. Additionally, further problems are caused by the degradation of the metal stamp as the print head wears out after repeated stampings, causing the stamped information to become less distinct. This can cause errors with vision systems used for inspections that image the stamped information and compare it to a digitized reference image since the stamped information will gradually depart from the reference image. At this point, the production line would have to be stopped, and a new reference image created or the stamp changed. Moreover, the stamp is not suitable for printing on curved surfaces. The use of the printing techniques disclosed herein overcomes these and other problems.

The printer 145 should be able to accommodate typical speeds on a production line of roughly 50–650 units per minute, while the resolution of the printer must be sufficient to print the bar code symbol in the available size and space. For example, an RSS Limited symbol must have 74 modules in the space provided. A module is the smallest building block for a bar code, e.g., the thinnest line that can be used for a portion of a 1-D bar code, or the smallest square that can be used for a portion of 2-D bar code. In one example of a compact label application, the linear portion of the bar code can be printed at 74 modules in 0.75 inches or just under 100 pixels or printer dots per inch.

Printer types that may be used include inkjet printers, laser markers, thermal transfer printers, thermal printers, electrographic printers and flexographic printers. With inkjet printers, inks are sprayed, via droplets of an ink solution, onto a label or other product surface. One example is the Domino A300 inkjet printer. Laser markers typically use a $Nd^3$-YAG or $CO_2$ laser that leaves an image by burning away portions of a special black-coated paper. A laser marker is also referred to herein as a printer. One example is the Autolase® from Automated Laser Corporation, Fort Wayne, Ind. With thermal transfer printers, a print head that contains resistive elements in a linear array heats ink-coated films (ribbons). The head is in direct contact with the uncoated side of the ribbon and the ink-coated side of the ribbon is in direct contact with the label's printable surface. The ink is heated, causing it to melt and adhere to the printing surface. Specially formulated materials are used for the printable surface of the label to enhance high ink transfer efficiency and adhesion. One example is available from Zebra Technologies Corporation, Vernon Hills, Ill. Thermal printers are useful for applications with a short shelf life. One example is the Informatics Thermal Bar Code Printer. Electrographic printers, also known as electron beam imaging printers, and laser printers, are also readily available and may be used.

The inkjet and laser marker are non-contact printers since they do not touch the label or other printable surface, while the thermal and thermal transfer printers are contact printers. Non-contact printers are particularly suitable for printing labels after they have been applied to a curved surface such as a rounded container, or for printing directly on the rounded container. In fact, printing on such a rounded surface can be preferable since the information is printed from the same perspective from which it will be subsequently read by a scanner. In contrast, when a flat label is printed and subsequently applied to a rounded container, the edges of the printed information appear to be distorted to a scanner, which may cause reading errors. For example, a vertical bar at the edge of a bar code will appear to be thinner when viewed from the perspective of the center of the bar code.

Figure 4:
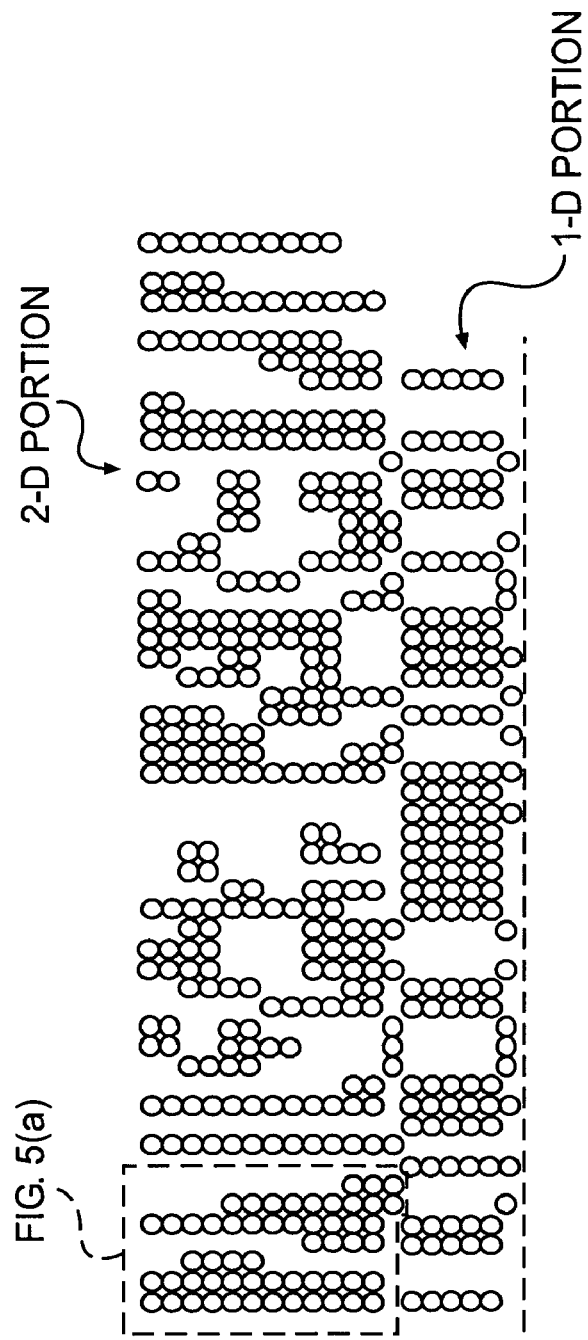
FIG. 4 illustrates a dot pattern fed to a printer.
Figure 5A:
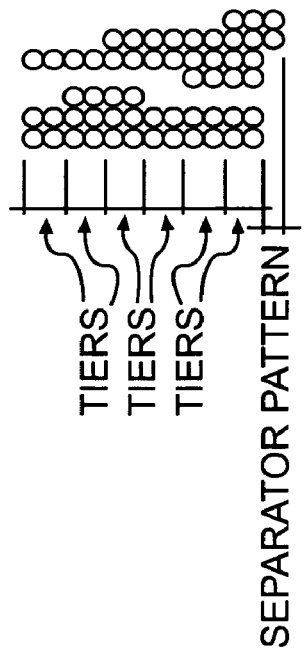
FIG. 5(*a*) illustrates a bar code with two dot lines per tier, and a separator pattern.

The use of such printers that are computer-controlled on a production line provides a significant advantage over conventional techniques by allowing information that relates to a specific production run to be updated as required and printed automatically. For example, the printer 145 can be reconfigured at the start of a production run, or during a production run, for different printing formats, e.g., bar code type, size, stacked vs. non-stacked, composite vs. non-composite, and so forth. In particular, the printer 145 may be driven by images provided to it by the printer computer 120, such as one provided by Barcode Technology Inc. (BTI). The printer computer 120 runs a software application that, among other things, takes an input for specified information associated with a production run and creates a corresponding bar code image or indicia. This bar code image, which may be, e.g., the 2-D bar code image that is combined with a linear (1-D) bar code such as the RSS Limited or stacked bar code to form a composite bar code, may also include a separator pattern (FIG. 5(a)). With an inkjet printer, this image is fed to the printer as a dot pattern, e.g., as shown in FIG. 4, which includes a 1-D portion on the bottom and a 2-D portion on the top, which together form a composite bar code symbol. The laser marker and thermal printers may be similarly driven to provide the desired printing using techniques known to those skilled in the art. The printer computer 120 may also receive information from a bar code scanner 115, e.g., which reads one or more bar codes such as from a work order printed on a sheet of paper.

Figure 5C:
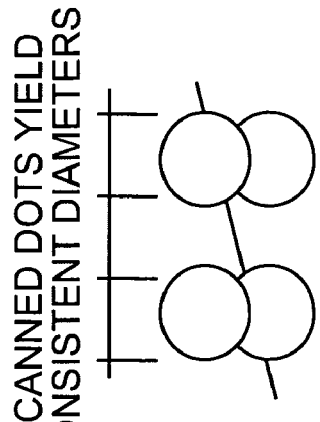
Figure 5B:
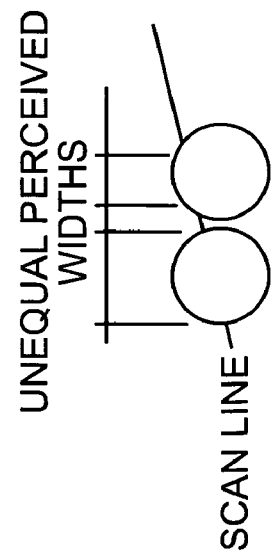

Inkjet printers present some challenges in achieving a readable bar code since only a limited number of dots in the height and width of the image can be printed. This is a severe limitation, in particular, when printing both the 2-D part of a composite bar code, a print separator and the human readable information. The dot pattern of FIG. 4, a portion of which is shown in greater detail in FIG. 5(a), addresses this problem by using a bar code with two dot lines per tier, with a total of six tiers, and a separator pattern. Here, every two lines or rows of dots represent one tier of the 2-D part of a composite symbol. In particular, the problems inherent in the reading of bar code images can be overcome by devoting two or three lines of dots to each tier of the 2-D data. If only one dot line is used for a single 2-D data tier, there is a risk that the bar code scanner would scan through different sections of the dots, which could cause erroneous results. In particular, FIG. 5(b) illustrates a scan line through a bar code tier with one dot line per tier. Since the scan direction is often at an angle to the tier direction due to user handling of the scanner and/or bar coded container, the laser scan line may pass through two dots in a way that causes the perceived widths of the dots to be unequal, which can result in an improper reading. In contrast, by providing two or more overlapping dot lines per tier, as shown in FIG. 5(c), the perceived widths of the scanned dots will be generally consistent, thereby eliminating the reading problem. For example, using the above approach, with a printer such as the Domino A300, 21/2=10 tiers can be accommodated in the bar code. Moreover, assuming the bar coded information is to include expiration date and lot or batch number, the number of characters used to represent this information must be limited, e.g., to eight characters.

Once the printer 145 has received the bar code image from the computer 120, e.g., in the form of a dot pattern, further adjustments to the printer software image may be made, including, e.g., the orientation, the distance between dots, and the distance between columns. Moreover, the speed of the production line may be synchronized with the printer's capabilities. The printer 145 may have an adjustment for the tolerance of the variations in speed and variations in print gain, e.g., the size of the dot due to ink spread. Furthermore, adjustments can be made by changing the height of the printer head above the labels or other surfaces to be printed on, and the vertical spread of the dots in the dot column.

Figure 3A:
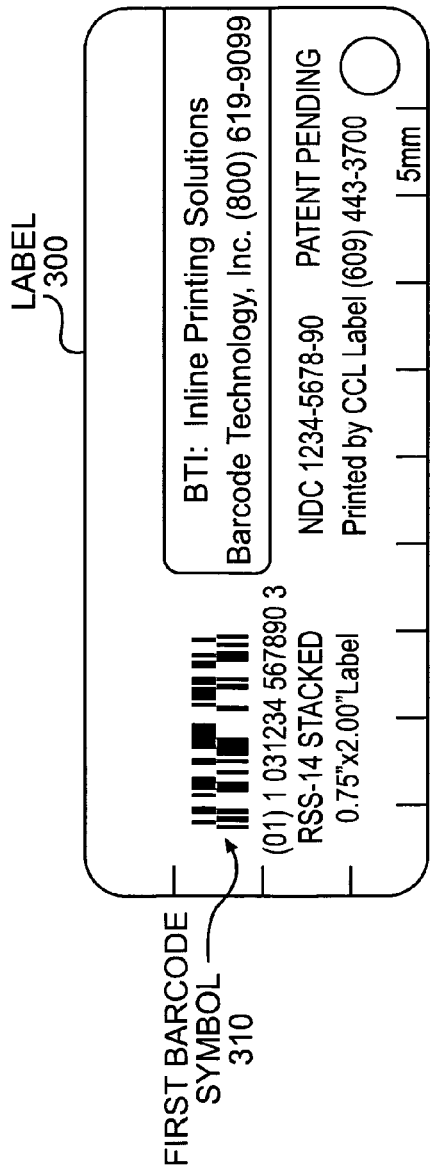
FIG. 3(*a*) illustrates a label with first bar code information in accordance with one embodiment of the invention.
Figure 3B:
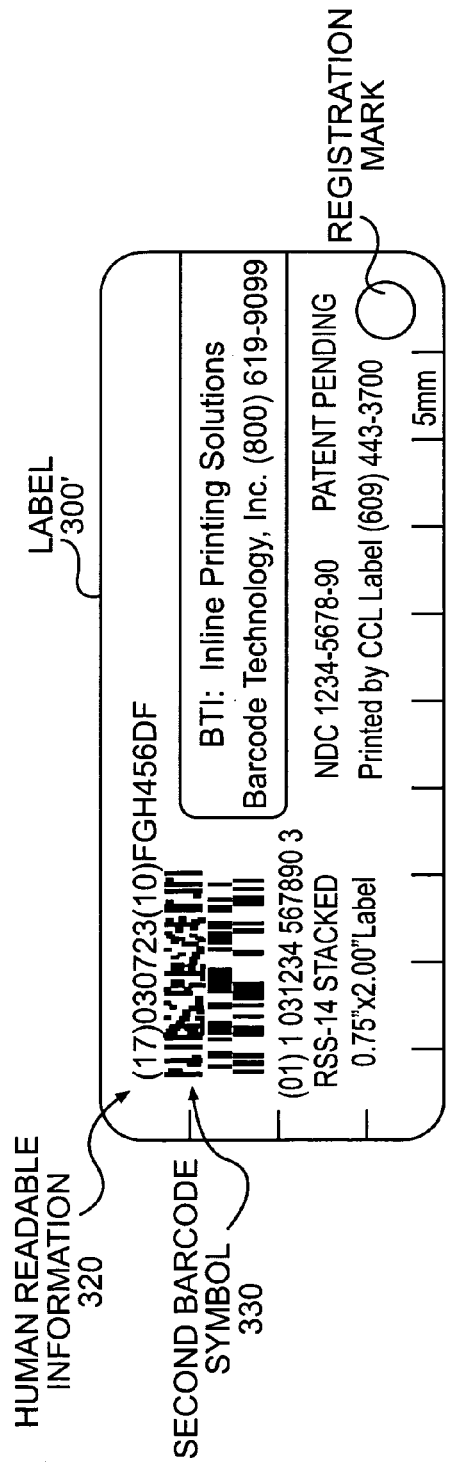

There is also the problem of registration, which amounts to control of the x and y-dimensions of the placed bar code on the label or product. In particular, the printer 145 must know when to print the bar code. For example, it may be necessary to print a 2-D bar code symbol along with the human readable data so that they fall within acceptable distances of, and do not overlap with, an existing bar code symbol. The particular tolerances that apply will depend on the specific symbology. For example, the RSS symbologies allow for relatively loose tolerances. Moreover, scanners typically only require that a linear bar code be seen in the same field of vision as the 2-D bar code, regardless of its x-dimension or placement, or even orientation, before it hunts for and reads the 2-D bar code. Tests of one possible embodiment have shown that the x-dimension may vary from 19–39 mils. The x-dimension adjustment may be accomplished by a photosensitive eye that reads the label or other printed surface to locate a registration index mark, typically a ⅛ inch diameter black dot pre-printed on the label along with the other information, as shown in FIGS. 3(a) and 3(b), after which the printer is signaled to begin a new print cycle. For example, if a registration mark appears with every label, which is 1⅝ inch in length, and there is a ⅛ inch space between labels, a printer rated at 720 inches per minute could produce 720"/1.75"=411 labels per minute. The y-dimension control is accomplished by adjusting the bracket that holds the print head in relation to the labels or other surfaces passing underneath.

The printer 145 may be controlled by a computer 120, as discussed, which receives input instructions from a scanner 115, a user, e.g., manually, via a keyboard and/or a remote computer 124. In one approach, the user manually enters information into the computer 120 to cause it to print specific information on the labels or other product surfaces. The user may obtain this information in human readable form from a printed work order, for instance, or from a telephone call or the like, and key in the information. In another approach, the printer is configured, e.g., re-programmed, via information obtained from the scanner 115, which may scan in printed bar-coded instructions, e.g., that identify the production run related information. This approach avoids problems with data entry errors that may be keyed in by the user. The bar-coded instructions may be printed using a computer in a known manner. For example, a first worker who is in charge of scheduling the activities of one or more production lines may print the bar coded work order for delivery to a second worker who operates the production line equipment. The second worker then places the work order in front of the scanner 115 to have the information read in to re-program the computer 120.

In another approach, the computer 124 communicates the information to be printed directly to the printer computer 120 via any known data communication scheme, e.g., such as TCP/IP. Alternatively, the computer 124 is not networked t the computer 120, but communicates with the computer 120 via, e.g., a Small Computer System Interface (SCSI). Furthermore, the computer 124 may represent a central/master computer that provides instructions to local computers that are associated with different production lines in different locations, whether they are in the same facility, or in different facilities in different geographic areas. Although indicated as being remote in FIG. 1, the computer 124 may be located essentially anywhere.

Additionally, an inspection station 180 may be provided on the production line 100 that receives data from a video camera 182 and a barcode reader 184, which in turn observe finished products that exit form the label applicator 157. The video camera 182 may be a CCD camera used to provide a visual inspection of various factors such as label placement, label content, presence of a label and a seal and presence of a bar code and human readable data. The inspection station 180 may display information, such as error messages, on a CRT screen/monitor to inform an operator of any problems. The bar code reader or scanner 184 may scan the bar code printed on the product to verify its accuracy and consistency, for example, as discussed further in connection with FIG. 6. After the products have been labeled, if applicable, scanned and checked, they may be assembled into multiple unit packages and shipped to their destination.

Figure 2:
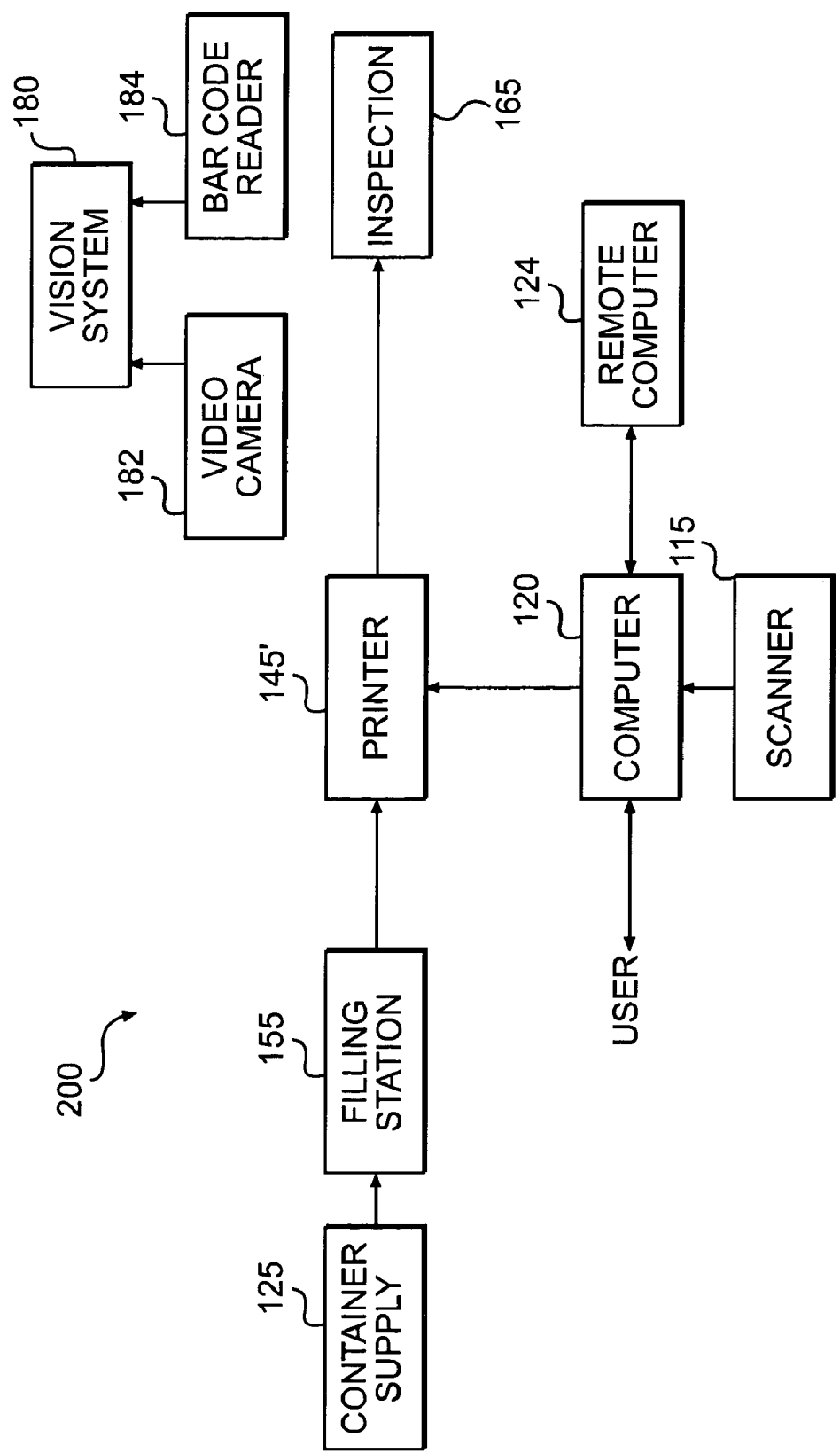
FIG. 2 illustrates a production line that prints bar code information on product containers in accordance with one embodiment of the invention.

FIG. 2 illustrates a production line 200 that prints bar code information on product containers in accordance with one embodiment of the invention. The printer 145' may print directly on the product container or other printable surface associated with a product, such as an "outsert" or printable tab that is attached to the container or other packaging. An outsert is analogous to an insert such as printed instructions that may be inserted inside a product container. Moreover, printing may occur on the product itself. For example, for a medication in tablet form, printing may occur on the tablet using digestible ink. For non-digested medications, printing may occur on a patch on the medication.

In this case, there is no need to print on a label and apply the label to a container, although both approaches may also be used together.

Moreover, note that the order of the stations shown in the production lines 100 and 200 is only an example. For instance, for the production line 100 of FIG. 1, the printer 145 may be located after the label applicator 157, in which case the labels are printed after being applied to the containers. Thus, printing can occur on a label: (a) only before the label is applied to a container, (b) both before the label is applied to a container and after, or (3) only after the label is applied to a container.

Furthermore, referring to FIGS. 3(c)–3(f), more than one printer may be used so that printing can occur at multiple locations on the production line. For example, due to the limited vertical range of a single printer, it may be desirable to divide the printing of bar code information between two or more printers. A first printer can print the bottom half of the bar code, while the second printer prints the top half, for instance. In a specific example, assuming a 1-D bar code indicia has been pre-printed on a label, and a 2-D bar code indicia is to be added during a production run to form a composite bar code, a bottom half of the 2-D bar code may be printed on one printer, while the top half of the 2-D bar code is printed on another printer. Moreover, in another variation, the containers may be filled after they are printed. FIGS. 3(c)–3(f) illustrate pre-printed labels and labels printed during production that illustrate some of the various options. Note that although labels are referred to here, the discussion applies as well to other printable surfaces, such as containers, packaging and outserts. In FIG. 3(c), the label has no pre-printed bar code, and two bar codes 352 and 354 are printed during production. In FIG. 3(d), the label has a first bar code 362 pre-printed, and a second, supplemental bar code 364 is printed during production. In FIG. 3(e), the label has a first part or indicia 374 of a bar code 372 pre-printed, and the second, supplemental part or indicia is printed during production to complete the bar code 372. That is, the indicia 372 and 374 are joined or concatenated vertically. Similarly, in FIG. 3(f), the label has a first part or indicia 384 of a bar code symbol 382 pre-printed, and the second, supplemental part or indicia is printed during production to complete the bar code 382. That is, the indicia 382 and 384 are joined or concatenated horizontally.

Figure 6:
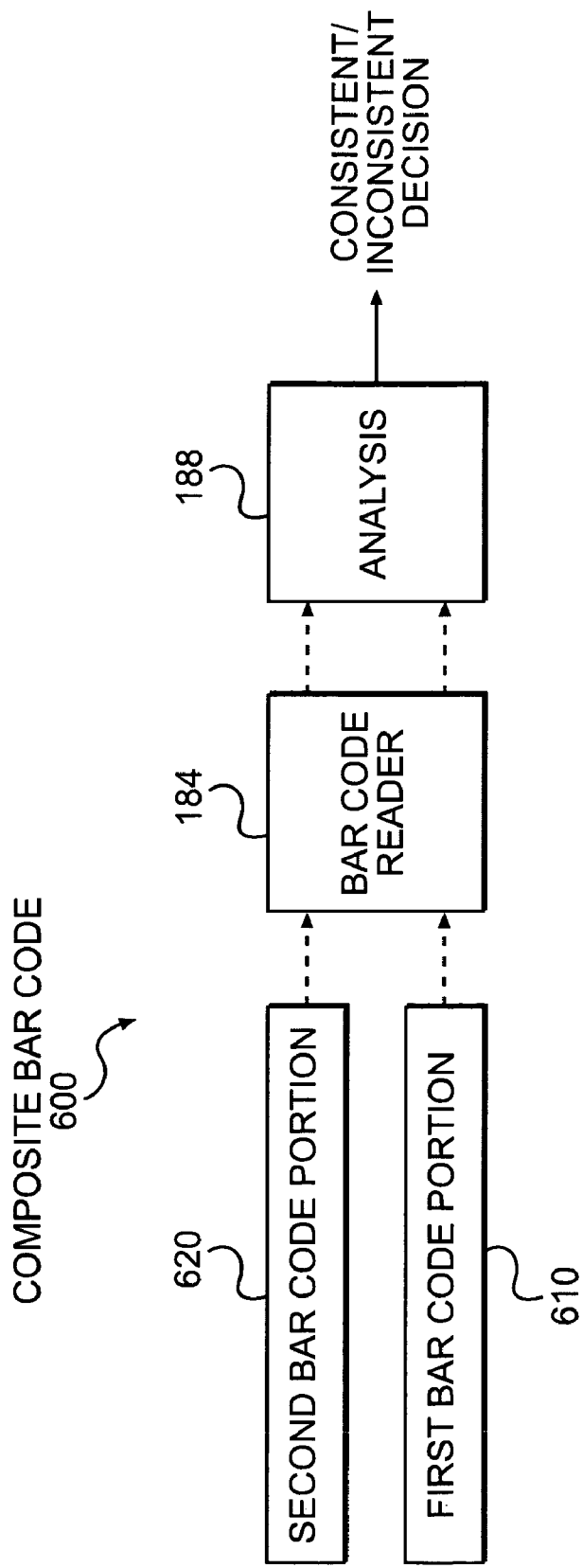
FIG. 6 illustrates a process for determining whether portions of a composite bar code carry consistent information.

FIG. 6 illustrates a process for determining whether bar code portions of a composite bar code carry consistent information. This may be done for portions of a composite bar code, portions of a single bar code and multiple bar codes. For example, for a composite bar code 600, the invention may be used to verify that information carried by the first portion or indicia 610 and information carried by the second, supplemental portion or indicia 620 are consistent. In this approach, the bar code reader 184 reads and decodes the respective bar code portions 610, 620 and provides the decoded information to an analysis function 188, which analyzes the received information to determine if there is a known correspondence. The analysis function 188 may be implemented at the inspection station 180, for instance. For example, the first bar code portion 610 may include a product identifier such as the National Drug Code (NDC) of a specific drug (e.g., drug A), while the second bar code portion 620 includes a commodity number, which identifies one of multiple different possible formulations of the specific drug (e.g., formulation A1). The analysis function 188 is pre-programmed with information that drug A is know to have formulations A1, A2 and A3, drug B is known to have formulations B1 and B2, and so forth. The different formulations may represent different dosages, concentrations or delivery methods, e.g., tablet, injectable, IV drip, or temperature, volumes and pressures used during manufacture.

The analysis function 188 can use appropriate logic, include lookup tables, databases or other known software techniques, to determine that the formulation A1 which is identified by the commodity number is consistent with the drug A, and output a "consistent" decision. However, if the product identifier was for a drug B, and the commodity production number was for a formulation A1, the analysis function 188 would output an "inconsistent" decision. In this case, an error may have occurred in the printing of one of the bar code portions or symbols. The error can be signaled by an audible alarm or a visual message sent to an operator via a computer display or the like.

Figure 7:
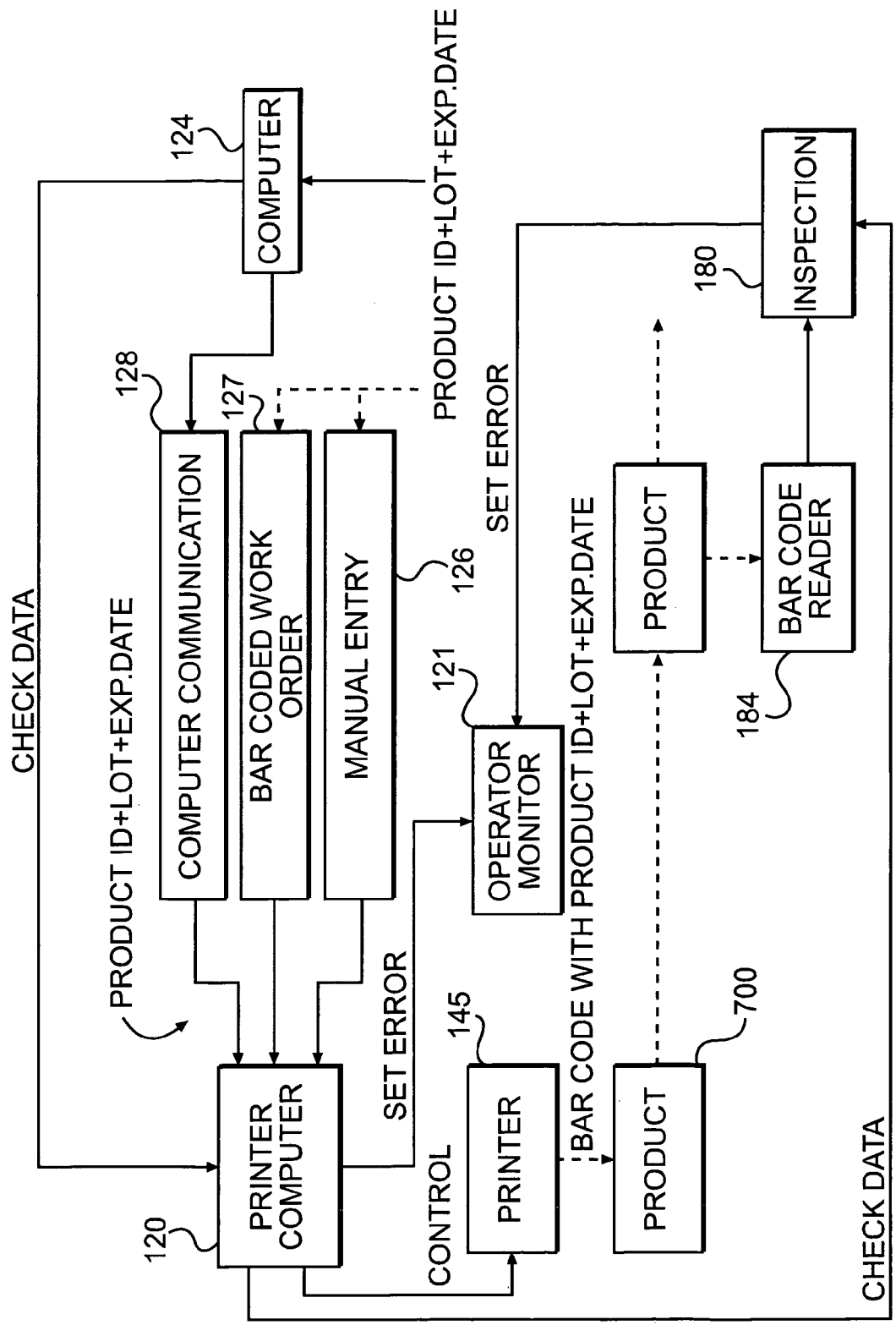
FIG. 7 illustrates an error detection process using check data.

FIG. 7 illustrates an error detection process using check data. In a further aspect of the invention, a local or remote computer, illustrated by computer 124, may convey check data such as a check digit to the printer computer 120 at one or more production lines to ensure data integrity. For example, during the production of products such as drugs, batches of the product are prepared, and information related to a production run, such as lot or batch number, expiration date and commodity number, are determined when the batch is ready for bottling. The expiration date is based on periods of time calculated for the safe shelf life for each product, while the batch or lot number is an assigned number and/or text identifier based on the batch or lot identification system used. In a manual entry approach 126, this information, along with the product identifier, may be written down and conveyed to a user at the production line who manually enters the information into the printer driver software at the computer 120. In a computer communication approach 128, the information is transmitted electronically from the computer 124 to the printer computer 120 via a computer network, serial link, or other wired or wireless electronic link. In a bar-coded work order approach 127, the information is printed on paper as one or more bar code symbols by the computer 124, or other computer, and the paper is scanned in by a bar code scanner associated with the computer 120 as a work order. As a specific example, the information from which the check data is calculated may include a data string based on a product identifier (PRODUCT ID), a lot number (LOT) and an expiration date (EXP. DATE). This is also the information that is printed by the printer 145 as a bar code on the products during the production run.

To ensure that the computer 120 has received the proper information, corresponding software may be implemented at the computers 120 and 124 to compute check data, such as a check digit, based at least in part on the production-run related information using any known check digit algorithm. One example is the modulus 10 algorithm, also known as the LUHN formula. The check data can then be transmitted from the computer 124 to the printer computer 120, where the printer computer 120 calculates its own check data based on the information that it receives, e.g., via manual entry 126, a bar coded work order 127, or a computer communication 128. The check data can be transmitted electronically via the computer communication path 128 or a separate communication path. The check data calculated by the computer 120 is then compared to the check data it receives from the computer 124 to determine if they agree. If they do agree, it is assumed that the production-run related information and other information, if applicable, has been accurately communicated to the printer computer 120, and a corresponding bar code symbol may be printed on an example product 700. If the check data do not agree, the software at the printer computer 120 may set an error message, e.g., to alert an operator of the problem, via a monitor 121. A mismatch indicates that either the check data from the computer 124 was not accurately received by the printer computer 120, or the information from which the check data was generated at the computer 124, e.g., PRODUCT ID+LOT+EXP. DATE, was not accurately received by the printer computer 120. If there is an error, the information can be re-communicated to the printer computer 120.

Moreover, the check data may be used by an inspection station 180 and bar code reader 184 that scans the bar code symbol after it is printed on the product 700 to confirm that the bar code is accurate. In particular, the bar code information is scanned and check data is computed from the scanned in information by the inspection station 180. This check data is then compared to check data received from the printer computer 120 to confirm they match. An error message may be sent to the operator monitor 121 if the check data do not agree and/or an audible alarm may be set or the like. The operator can then take an appropriate action such as stopping the production line or personally inspecting the products.

Accordingly, it can be seen that the present invention provides methods and apparatuses for applying bar code information to products on a production line. In one aspect of the invention, bar code information is printed on a printable surface of a product during a production run that includes two components, where the first component is either pre-printed or printed real-time during a production run, and the second component is printed during the production run. The first component may include a product identifier, and the second component may include information related to the production run, such as a lot or batch number, commodity number and expiration date for the product. In another aspect, check data is used to confirm the accuracy of production-run related information that is received by a printer computer for use in printing a bar code. When encoded into a printed bar code, the check data may further be used by an inspection station to verify that the bar code was printed accurately on the product. In another aspect, bar code symbol portions are verified for consistency by scanning them in after they have been printed, and accessing a database to verify that information associated with the symbol portions is consistent.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for applying bar code information to a product on a production line, comprising:
   pre-printing, prior to a production run, and on a printable surface associated with the product, bar code information associated with the product;
   printing, on the printable surface associated with the product, and during the production run, bar code information that supplements the bar code information associated with the product;
   wherein the supplemental bar code information provides information associated with the production run, and
   wherein the supplemental bar code information and the bar code information associated with the product form a composite bar code.

2. The method of claim 1, wherein:
   the supplemental bar code information identifies at least one of a lot, batch, expiration date and commodity number associated with the production run.

3. The method of claim 1, wherein:
   the bar code information associated with the product identifies at least one of the product and information for using the product.

4. The method of claim 1, wherein:
   the printable surface comprises a label.

5. The method of claim 4, wherein:
   the pre-printing occurs before the label is applied to a container of the product.

6. The method of claim 4, wherein:
   the pre-printing occurs after the label is applied to a container of the product.

7. The method of claim 1, wherein:
   the printable surface comprises a container of the product.

8. The method of claim 1, wherein:
   the printable surface comprises a tab associated with the product.

9. The method of claim 1, wherein:
   the pre-printing comprises printing using at least one of ink jet printing, laser marking, laser printing, electrographic printing, flexographic printing, thermal transfer printing, thermal printing and electrographic printing.

10. The method of claim 1, wherein:
    the supplemental bar code information is concatenated horizontally with the bar code information associated with the product.

11. The method of claim 1, wherein:
    the supplemental bar code information is concatenated vertically with the bar code information associated with the product.

12. An apparatus for applying bar code information to a product on a production line, comprising:
    means for pre-printing, prior to a production run, and on a printable surface associated with the product, bar code information associated with the product;
    means for printing, on the printable surface associated with the product, and during the production run, supplemental bar code information that supplements the bar code information associated with the product;
    wherein the supplemental bar code information provides information associated with the production run, and
    wherein the supplemental bar code information and the bar code information associated with the product form a composite bar code.

13. A method for applying bar codes for a product on a production line, comprising:
    pre-printing, prior to a production run, and on a printable surface associated with the product, bar code information associated with the product;
    programming a computer with supplemental information associated with the production run;
    printing, responsive to the programming, during the production run, and on the printable surface associated with the product on the production line, the supplemental information as supplemental bar code information,
    wherein the supplemental bar code information and the bar code information associated with the product form a composite bar code.

14. The method of claim 13, wherein:
    the information carried by the bar code indicia identifies at least one of a lot, batch, expiration date and commodity number associated with the production run.

15. The method of claim 13, wherein:
    the programming comprises scanning a bar code to provide the computer with the information.

16. The method of claim 13, wherein:
the programming comprises receiving a manual user input to provide the computer with the information.

17. The method of claim 13, wherein:
the programming comprises receiving an electronic transmission to provide the computer with the information.

18. The method of claim 13, wherein:
the pre-printing comprises printing using at least one of ink jet printing, laser marking, laser printing, electrographic printing, flexographic printing, thermal transfer printing, thermal printing and electrographic printing.

19. The method of claim 13, wherein:
the printable surface comprises a label.

20. The method of claim 13, wherein:
the printable surface comprises a container of the product.

21. An apparatus for applying bar codes for a product on a production line, comprising:
pre-printing, prior to a production run, and on a printable surface associated with the product, bar code information associated with the product;
means for programming a computer with supplemental information associated with the production run;
means for printing, responsive to the programming means, during the production run, and on the printable surface associated with the product on the production line, the supplemental information as supplemental bar code information, wherein the supplemental bar code information and the bar code information associated with the product form a composite bar code.

22. An error detection method for use in a production line in which bar codes are applied to products, comprising:
receiving first check data at a first computer that controls a printer on the production line;
wherein the first check data is calculated at a second computer based on information associated, at least in part, with a production run on the production line;
receiving the information at the first computer;
computing second check data at the first computer based on the received information; and
determining whether the first and second check data agree.

23. The method of claim 22, further comprising:
instructing the printer to print, during the production run, on a printable surface associated with a product, and when the first and second check data agree, bar code indicia that carries the received information.

24. The method of claim 22, further comprising:
setting an error message if the first and second check data do not agree.

25. The method of claim 22, wherein:
the first check data is received at the first computer via an electronic transmission from the second computer.

26. The method of claim 22, wherein:
the information is received at the first computer via an electronic transmission from the second computer.

27. The method of claim 22, wherein:
the information is received at the first computer via a manual user entry.

28. The method of claim 22, wherein:
the information is received at the first computer by scanning a bar code.

29. The method of claim 22, wherein:
the information comprises a product identifier and at least one of a lot, batch, expiration date and commodity number associated with the production run.

30. An error detection apparatus for use in a production line in which bar codes are applied to products:
means at a first computer for receiving first check data;
wherein the first computer controls a printer on the production line, and the first check data is calculated at a second computer based on information; associated, at least in part, with a production run on the production line;
means at the first computer for receiving the information;
means at the first computer for computing second check data based on the received information; and
means for determining whether the first and second check data agree.

31. An error detection method for use in a production line in which bar codes are applied to products:
reading first pre-printed bar code indicia from at least one product during a production run on the production line to recover first information therefrom;
printing, during the production run, second bar code indicia representing second information about the production run;
reading the second bar code indicia from the at least one product during the production run to recover the second information therefrom; and
determining if the first and second information are consistent,
wherein the first and second bar code indicia form a composite bar code symbol.

32. An error detection apparatus for use in a production line in which bar codes are applied to products, comprising:
means for reading first pre-printed bar code indicia from at least one product during a production run on the production line to recover first information therefrom;
means for printing, during the production run, second bar code indicia representing second information about the production run;
means for reading the second bar code indicia from the at least one product during the production run to recover the second information therefrom; and
means for determining if the first and second information are consistent,
wherein the first and second bar code indicia form a composite bar code symbol.

* * * * *